US009686159B2

(12) United States Patent
Poe

(10) Patent No.: US 9,686,159 B2
(45) Date of Patent: Jun. 20, 2017

(54) VISUAL REPRESENTATIONS OF STATUS

(71) Applicant: Hewlett-Packard Development Company, L.P., Houston, TX (US)

(72) Inventor: Daryl T. Poe, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 454 days.

(21) Appl. No.: 14/473,350

(22) Filed: Aug. 29, 2014

(65) Prior Publication Data

US 2016/0065425 A1    Mar. 3, 2016

(51) Int. Cl.
*H04L 12/26*  (2006.01)
*G06T 13/00*  (2011.01)
*G06T 11/20*  (2006.01)

(52) U.S. Cl.
CPC .......... *H04L 43/045* (2013.01); *G06T 11/206* (2013.01); *G06T 13/00* (2013.01)

(58) Field of Classification Search
CPC ............... H04L 43/045; H04L 12/2602; H04L 41/0853; H04L 41/12; H04L 41/147; H04L 41/22; H04L 43/00; H04L 43/022; H04L 43/04; H04L 43/106; H04L 43/12; H04L 67/12; G06F 17/30551; G06Q 10/0635; G06T 11/206; G06T 13/00
See application file for complete search history.

(56) References Cited

U.S. PATENT DOCUMENTS

| 6,513,065 | B1 | 1/2003 | Hafez et al. | |
|---|---|---|---|---|
| 6,901,442 | B1* | 5/2005 | Schwaller | H04L 43/0817 709/223 |
| 7,924,283 | B1* | 4/2011 | Hao | G06T 11/206 345/428 |
| 2005/0099993 | A1* | 5/2005 | Ozawa | G04R 20/08 370/350 |
| 2007/0262994 | A1 | 11/2007 | Meighan et al. | |
| 2013/0091168 | A1 | 4/2013 | Bhave et al. | |
| 2014/0184423 | A1 | 7/2014 | Mensinger et al. | |
| 2014/0236668 | A1 | 8/2014 | Young et al. | |
| 2015/0033086 | A1* | 1/2015 | Sasturkar | G06F 11/0709 714/57 |

OTHER PUBLICATIONS

Mansmann, Florian. Visual analysis of network traffic: Interactive monitoring, detection, and interpretation of security threats. Diss. 2008.*

(Continued)

*Primary Examiner* — Sultana M Zalalee
(74) *Attorney, Agent, or Firm* — HP Inc. Patent Department

(57) ABSTRACT

An example device in accordance with an aspect of the present disclosure is to generate a visual representation of a status of a metric. The visual representation is to be updated according to the granularity during at least a portion of a time period. The visual representation is to depict passage of time along a first dimension, and is to separate the time period into a plurality of time blocks to be depicted as being stacked along a second dimension of the visual representation.

14 Claims, 4 Drawing Sheets

(56) References Cited

OTHER PUBLICATIONS

Shu Shi et al., "Distortion Over Latency: Novel Metric for Measuring Interactive Performance in Remote Rendering Systems," 2011 IEEE International Conference on Multimedia & Expo (ICME), Jul. 11-15, 2011, pp. 1-6, IEEE.

Datasheet: Visual Performance Manager and TruView Advanced MPLS Package (SKU 01654), Fluke Networks, May 8, 2014, pp. 1-6, Fluke Corporation.

Frank Ohlhorst, "Review: Fluke Visual TruView 9.0," Apr. 2, 2014, pp. 1-5, Enterprise Networking Planet.

Visual TruView: Unified Network and Application Performance Management: Focused on the Experience of the End User, Fluke Networks, Mar. 2014, pp. 1-8, Fluke Corporation.

Visual TruView-Flow: Complete Traffic Analysis, Fluke Networks, Mar. 2014, pp. 1-2, Fluke Corporation.

\* cited by examiner

VISUAL REPRESENTATIONS OF STATUS

BACKGROUND

Tracking and displaying metrics for large amounts of data, e.g., from computer log files, may not enable events to be discerned readily. The large amount of data to be displayed may prevent the recognition of important factors whose fine details may be lost in the vastness of total data. Furthermore, data may be presented in formats that create difficulties in attempting to visually distinguish periodic problems and/or relative scales of problems (small problems versus large problems).

BRIEF DESCRIPTION OF THE DRAWINGS/FIGURES

DETAILED DESCRIPTION

Tools may monitor events, such as a data connection between computers, over a period of time. Data may be buffered for long periods, and may be displayed in various formats. Attempting to navigate through the data may result in scaling challenges, in attempting to discern details without losing sight of patterns or periodic/repetitive trends. For example, zooming into the data to reveal details of an event on, e.g., a specific minute of a specific day, may, in turn, obscure the bigger picture and whether a similar event occurred, e.g., on another day. Furthermore, the user interface may need to be scrolled excessively to the point of uselessness at that level of detail, resulting in exhaustive zooming in and zooming out in an attempt to observe the data at a useful scale. Some events may happen only at a certain time of night, and therefore may be missed entirely by using such an approach. The data may be presented at a poor level of granularity when viewing large amounts of data, but zooming in and out loses sight of the big picture.

In contrast to such tools, the examples provided herein enable viewing large amounts of data simultaneously, while preserving visible granularity to identify events of interest without needing to manipulate (zoom) the data. The data may be presented in a single visual representation that occupies relatively little visual space. In an example, remote connection quality metrics may be tracked with high granularity over long periods of time to obtain an image-based long-period remote connection quality graphing, via pixel color in a two-dimensional image. For instance, a single image can display metric values measured every second for the period of a week with one pixel per measurement. Periodic variation in the metrics can easily be recognized as visual artifacts that would otherwise be difficult to perceive. Reference marks may be added to the image for easily identifying an exact time of any exceptional event in the image.

Figure 1:
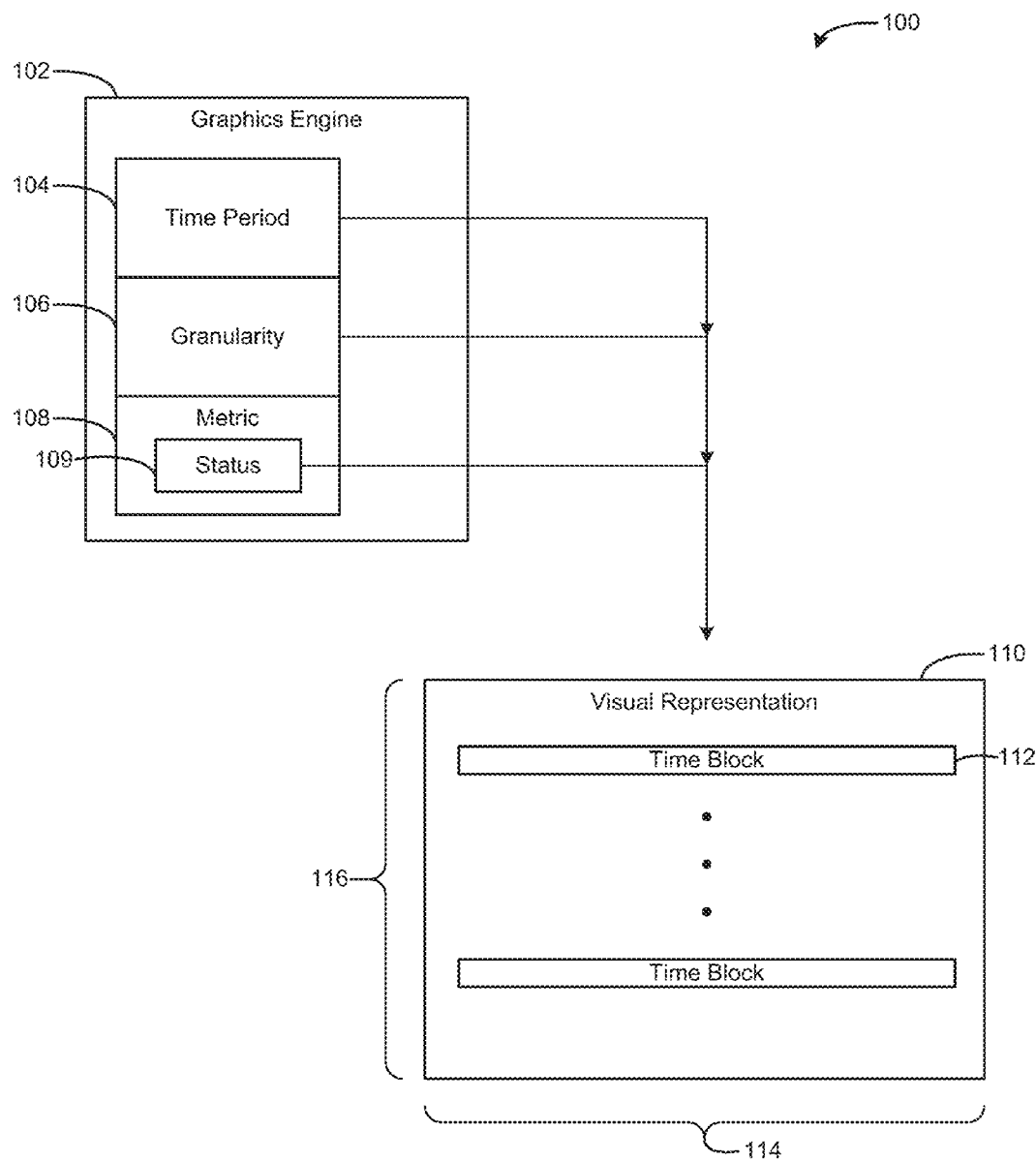
FIG. 1 is a block diagram of a system including a graphics engine and visual representation according to an example.

FIG. 1 is a block diagram of a system 100 including a graphics engine 102 and visual representation 110 according to an example. The graphics engine 102 is associated with a time period 104, a granularity 106, a metric 108, and a status 109. The visual representation 110 is associated with a time block 112, a first dimension 114, and a second dimension 116.

The system 100 enables, via visual representation 110, tracking of a status 109 of the metric 108 over at least a portion of the time period 104. For example, the system 100 may be experiencing an issue at a certain time of night, such as a periodic loss of connection with another system. The visual representation can provide tracking of the type/quality of connectivity experienced at the system 100. The connection between two computing systems may be subject to many variables that affect its quality. For example, the bandwidth available to the connection, the bandwidth used, the latency (e.g., ping time), the number of dropped and/or retransmitted packets, and so on may affect connection quality. In an example, a variable to be represented by the visual representation 110 may be a response time between the computing system 100 and a remote computing system such as a server (including times of disconnect or unresponsiveness).

Many kinds of metrics may be represented by visual representation 110, including metrics specific to a given connection protocol. For example, metrics associated with a connection protocol providing a remote application or desktop, such as Microsoft's® remote desktop protocol (RDP), Citrix's® virtual machine Ware (VMWare) View, Hewelett-Packard's® remote graphics software (RGS), and so on. Metrics also may include frame rate, time since last traffic was received from the remote computing system, a high-level state of the connection (whether the connection is active, inactive, disconnected, etc.), and so on. Other metrics also may be represented, such as power, temperature, computing load, etc., including metrics not related to computing systems.

The visual representation 110 may display the metric 108 using at least one time block 112. The metric 108 data may be visualized across the time block 112 along a first dimension 114, shown as horizontal. A plurality of time blocks 112 may be stacked along a second dimension 116, shows as vertical. In alternate examples, the dimensions may be reversed, e.g., by the time blocks extending along a vertical dimension and stacked along a horizontal dimension. Accordingly, the data may be used to build the two-dimensional visual representation 110, to fit a large amount of data into a relatively small-size.

In an example, the visual representation 110 may be formed as a two-dimensional image, by filling the image pixel-by-pixel, as data associated with the status 109 of the metric 108 is translated to visual elements of the time blocks 112. In alternate examples, the image may be composed of visual codes to represent the status 109 of the metric 108. A visual code may be made up of one or more image pixels. The data may be translated from stored data (e.g., logged data that is translated by a data parser), and in alternate examples, may be translated from a data stream in real-time as the data measurements are taken. Data may be saved to a file, and at least a portion of the data may be selected and analyzed later. Colors of the visual codes may be chosen to represent one or more metrics 108. Thus, by stacking the time blocks 112, visual artifacts become readily apparent for diagnosing issues associated with the status 109 of the metric 108.

A time block 112 may represent a discrete portion of the total time period 104 to be represented. For example, a time block 112 may represent 15 minutes, an hour, or other discrete blocks of time. In an example, a threshold block duration may be chosen, to establish a size of the time block 112 along the first dimension 114. Because the time block 112 represents a total time, a number of discrete visual codes that are sized to fit within a given time block 112 may be given as a function of the total time and the degree of granularity representing a visual code. For example, to fit an hour of visual data in a time block 112, a granularity of one second may be chosen to fit 3600 discrete granular visual codes into a time block 112. Thus, data for the status 109 may be sampled at a frequency of once per second. Alternatively, the data may be stored, such that the saved data may be interpolated and/or extrapolated to provide the desired granularity/sampling frequency. Additionally, the data may be adjusted to vary the visual representation 110. For example, the total length of the time block 112, and/or the granularity/sampling frequency of a visual code, may be varied to adjust an appearance of the visual representation. For example, the visual representation 110 may begin as a square, and cycle through iterations of rectangles of various aspect ratios between the first and second dimensions 114, 116. The visual representation 110 may be animated to cycle through various aspects and/or granularities, to provide varying distinctiveness in how visual artifacts may arise as readily apparent, according to the varying aspect/granularity over time in the animation, and how data carries over from one time blocks 112 to another.

The visual representation 110 may use colors and/or patterns to represent a third or more dimension(s). In alternate examples, other representations may be used, such as a third spatial dimension (e.g., a 3-D surface chart). Additional dimensions also may be represented. For example, six channels of data may be represented by the visual representation 110 using six different colors.

Human visual perception is generally good at detecting patterns and trends depicted in more than one spatial dimension, which may not be as readily apparent in textual data or a simple line graph. The visual representation 110 serves as a compact and intuitive form of representing a large amount of metric/status data. The visual representation 110 may be provided in an image-based format that may be easily shared on a wide variety of computing systems, without a need for a cumbersome custom program to view the metric data.

Figure 2:
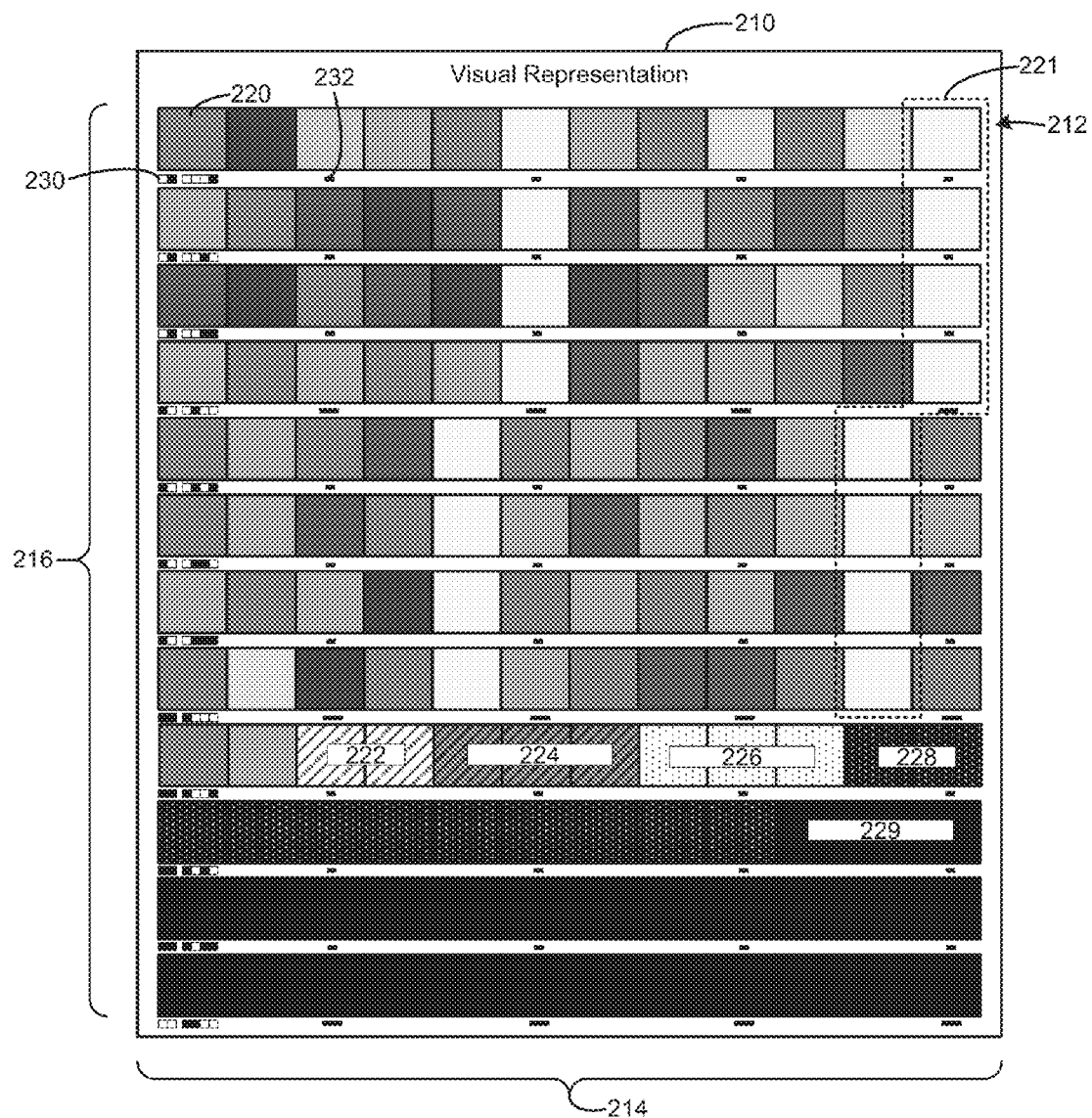
FIG. 2 is a block diagram of a visual representation according to an example.

FIG. 2 is a block diagram of a visual representation 210 according to an example. The visual representation 210 includes a plurality of visual codes 220, a plurality of time blocks 212, a first dimension 214, a second dimension 216, first reference information 230, second reference information 232, and visual artifact 221. The plurality of visual codes 220 include a first visual code 220, a second visual code 222, a third visual code 224, a fourth visual code 226, a fifth visual code 228, and a sixth visual code 229. Other visual codes are possible, beyond those specifically illustrated.

The visual representation 210 may be provided, e.g., by a computing system, to represent any number and type of data. In an example, the visual codes 220 are to use colors to represent a quality of a connection between two computing systems. The status of the connection quality may be represented at various levels of detail/granularity. For example, the status may be represented with a high level of granularity on a second-by-second basis, with each visual code 220 representing the status of the quality for a given second. Many such seconds may be represented using a dense concentration of visual codes 220, enabling the visual representation 210 to depict a long total period of time, such as a time period of a week, month, or year broken up according to a stack of a plurality of time blocks 212. As the time period progresses, for the granular increment as represented by a visual code 220, a color and/or pattern is used to represent the status of the metric (connection quality) for that increment. In an example, the color green is used if the connection is considered good/solid; yellow if the connection is considered "in doubt"; red if the connection is considered lost; blue if an attempt to reconnect is in-progress; etc. Furthermore, a brightness of each visual code 220 may be adjusted, e.g., the green color used for the various first visual codes 220 may be varied from a dark-green to a bright-green, based on a sub-category of the status indicated by that color. As illustrated, the brightness of the first visual codes 220 is varied to illustrate a bandwidth being used (i.e., a timing of the last traffic from the server) during the times where the status is still considered to be good. Thus, multiple dimensions may be represented by a given visual code 220, including combinations of color, brightness, patterns, three-dimensional height, and so on.

The example visual representation 210 illustrates a good connection for the first eight time blocks 212 (starting at the top time block 212 and counting downward). The good connection is represented using first visual code 220 (e.g., a green color) that varies in brightness according to the status. In the ninth time block 212, the indicated status changes, and is represented using second visual code 222. For example, a yellow color may be used to indicate a first problem state with the connection status, where the computing system is waiting for the status problem to resolve, and still actively attempting to resolve the problem and/or reconnect. As illustrated, following the second visual code 222, a third visual code 224 (e.g., a red color) is used to represent granular increments of the time period that the computing system is actively attempting to reconnect to the remote/server system. The fourth visual code 226 (light gray color) indicates that the computing system has failed to connect to the remote computing system, and is continuing to attempt connecting. The fifth visual code 228 (dark gray color) indicates that the computing system is no longer attempting to connect. The sixth visual code 229 (black) indicates a remaining portion of the time period for which data has not yet been collected. Thus, the visual representation 210 may be dimensioned (e.g., according to first dimension 214 and second dimension 216) to include at least a portion for which no data corresponds to that time period.

In an example, the various brightness levels of the first visual code 220 (e.g., green color) indicate the amount of delay since the last traffic from a remote server, with brighter green indicating more recent server traffic. The brightness levels may be scaled to proportionately and accurately represent the amount. For example, a maximum darkness level of 0.5 may represent a delay of six seconds, and 0.75 brightness may represent a three second delay. Thus, the dimension represented by brightness also may reflect a granularity (i.e., separate from and/or in addition to the time granularity).

The visual representation 210 may be adjusted by varying a granularity of visual codes 220 (e.g., time or levels corresponding to each visual code 220), by varying a number of the visual codes 220, and/or by changing a total number of visual codes 220 (e.g., independent of their granularity). Thus, data may be collected and/or divided up less frequently (e.g., at a lower granularity) to cover more time using a given number of visual codes 220. The visual representation 210 may be made larger by representing data over a greater time period (i.e., a larger number of visual codes 220). Even with a larger visual representation 210, vast amounts of data may be visualized without a need to zoom in on a specific portion, enabling a quick visual evaluation of the visual representation 210 to check for any potential patterns. The dimensions and granularity of the visual representation 210 may be adjusted in view of the metric/status to be represented. For example, in a gaming application, a smaller interval/higher granularity may be used to examine gaming latency to check during which moments the latency gets worse, perhaps indicating that somewhere on the network there is maintenance being carried out or other corresponding disruptions. In an example, a granular increment may be divided according to a scale of microseconds as appropriate for representing gaming latency.

Based on the dimensions used to generate the visual representation 210 (e.g., length of time block 212, granularity of visual code 220), a visual artifact 221 may become readily apparent. As shown, a series of brighter vertical lines are visible across the data representing the first eight time blocks 212. The visual artifact 221 may represent a periodic event happening roughly every sixth granular increment (two instances per time block 212). The event is slightly skewed as time progresses, shown by the leftward shift in the visual artifact 221 between the fourth and fifth time blocks 212. This type of periodic pattern manifests in the visual representation 210 as a readily apparent visual artifact 221 due to the dimensions and vertical alignment across a plurality of time blocks 212. However, such an effect would be lost in other data formats (e.g., a line graph) that lack the features/dimensions of the visual representation 210. Furthermore, the visual artifact 221 may be less visually striking depending on a number of visual codes 220 used per time block 212. The skewing of the visual artifact 221 may be caused by updating a local clock with the server clock, when requesting a time update, thereby skewing the data. Such information is readily apparent in the visual representation 210; not only the existence of an anomaly, but also the more subtle existence of the skewing over time in the anomaly, resulting in the illustrated visual artifact 221.

The various characteristics of the visual representation 210 are fully customizable, e.g., to reflect different quality standards needed by different applications/customers. For example, one application may tolerate latency of multiple seconds, in contrast to another application where even a single second is not acceptable. Accordingly, a threshold length of the time block 212 may be extended or shortened, and each visual code 220 similarly may be used to represent more or less of the time period. Similarly, the sensitivity between changing from one type of visual code to another (e.g., from third visual code 224 to fourth visual code 226) also may be varied. One application may indicate a transition upon exceeding a timeout of six seconds, and another may use a timeout of eight seconds, and so on.

The visual representation 210 is shown interspersed with first reference information 230 and second reference information 232, to precisely and accurately indicate timing information when certain events or trends are active. The data may be spaced as shown to keep the visual representation 210 compact while enabling the gaps to be visually ignored without creating visual distractions. In alternate examples, the reference information may be provided separately and/or as an overlay (i.e., overlaid onto the visual codes 220, instead of interspersed between them). The data overlay may be turned on/off as desired, and may be provided at different levels of granularity (e.g., dividing by hour or day, zooming in/out, etc.) to enable desired backtracing to determine exactly when an event happened and its duration. An analysis tool also may be used to visually analyze the visual representation 210, to identify the reference information 230, 232 and visual codes 220, to determine exact corresponding pixel positions for back-calculating events and times. For example, a user may optically scan the visual representation 210, similar to how a barcode or Quick Response (QR) Code may be scanned using a mobile device for visual analysis.

The data of a time block 212 may be designated with reference information 232 to serve as markers for, e.g., indicating a sub-period of time such as a minute along the gaps between time blocks 212. The first reference information 230 may use binary coded colors to represent numerical data, e.g. white-blue-white-blue might represent 0101 binary=5 decimal, which might indicate which hour of the day and/or day of the week is represented by the time block 212 and/or visual code 220. Summary information also may added to the visual representation 210, such as concluding each hour or time block 212 with a binary or color-coded representation/summary of averages for the metric and/or counts of events over the corresponding time period. For example, reference information may indicate a number of times a particular status/sub-status (e.g., a lost connection) of a metric was encountered within a given time period (e.g., within time block 212 and/or the entire visual representation 210). In another example, reference information may indicate an average brightness level encountered throughout a time period, or other characteristics.

Such reference information may be provided in the visual representation 210 in real-time as data is represented by the visual representations 210 and time blocks 212. Accordingly, examples of visual representation 210 enable instantaneous appreciation for events as they occur, without a need to use a post-analysis tool.

In alternate examples, multiple separate color channels may be mixed/combined with each other to represent multiple corresponding separate data channels/metrics. For example, a red color may be used to represent connection latency according to a relative brightness of the red, compared to the relative brightness of a green color that may be used to represent bandwidth consumption for that metric along the same corresponding time periods throughout a visual representation 210. The two colors may additively provide a yellow color, that varies toward green or red over time according to which additive factor is relatively more prevalent during a given time. Thus, the additive color channel may readily visually represent a correlation between the two sub-color channels, if the graph tends to show various shades of yellow indicating relative equality between channels. In contrast, the lack of yellow might indicate a lack of correlation between the channels, enabling the red or green to dominate. Color channels in the visual representation 210 may be used to represent independent channels in the metric data, or the colors may be overloaded to represent, not only qualitative information, but also state information for a given metric. Furthermore, multiple different metrics may be represented, e.g., by stacking each metric into a visual code 220.

Figure 3:
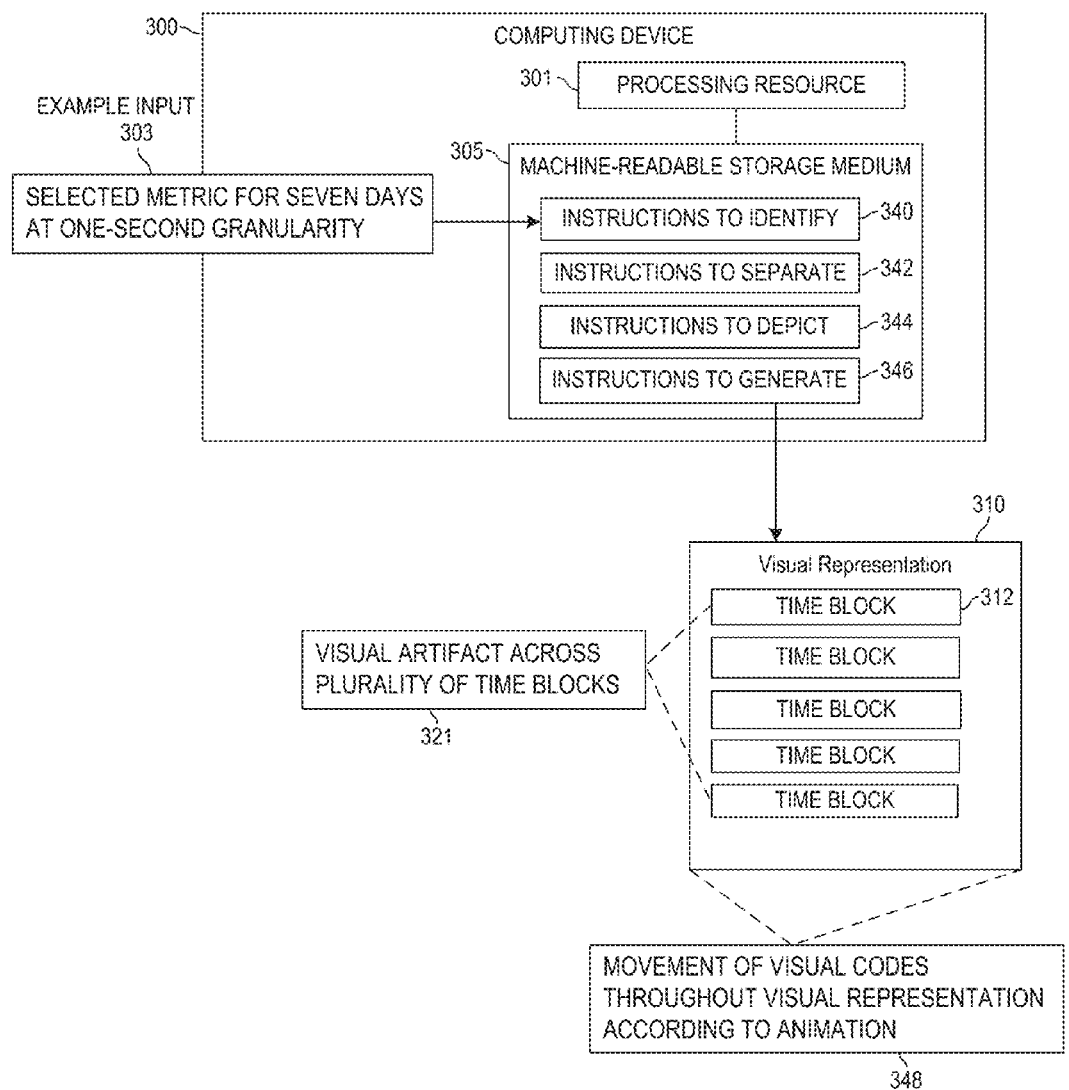
FIG. 3 is a block diagram of a computing device including a machine-readable storage medium, and a visual representation according to an example.

FIG. 3 is a block diagram of a computing device 300 including a machine-readable storage medium 305, and a visual representation 310 according to an example. The computing device 300 includes a processing resource 301, and is to receive example input 303. The storage medium 305 includes instructions to identify 340, separate 342, depict 344, and generate 346. The visual representation 310 includes a plurality of time blocks 312, and may depict a visual artifact 321 and animation 348.

The computing device 300 may represent a local computing system, such as a client system. The computing device 300 also may represent a remote computing system, such as a server system. Thus, the example instructions may be deployed locally and/or remotely, to provide the advantages enabled by the visual representation 310 where needed. In an example, the visual representation 310 may be a client tool that is used to diagnose problems experienced from the perspective of a client device. In an example usage scenario, a customer may experience a nightly disconnect event. The example machine-readable storage medium 305 may be provided to customer (e.g., sent from a server, installed on a client machine, provided as a separate installation disk, etc.) to obtain the visual representation 310 results. The customer may then share the results easily as a self-contained image, e.g., by emailing the image and/or screenshot for diagnosis. In an alternate example, the computing device 300 may be deployed as a portable diagnostic tool, such as a hand-held data collection and analysis tool.

The visual representation 310 includes a plurality of time blocks 312, that are spaced to readily illustrate a visual artifact 321 across the plurality of time blocks 312. In an example, the time blocks 312 may be dimensioned to wrap around the data in a way that lines up the visual artifact vertically. A graphics engine may analyze the data to identify a periodicity of the event, and arrange the dimensions of the visual representation 310 to readily illustrate the visual artifact 321. The visual representation 310 also may be animated to illustrate time-wise changes/movements in the data shown by each visual code and/or time block 312 forming the visual representation. The animation also may cycle through varying dimensions of the time blocks 312, e.g., to visually illustrate whether readily apparent visual artifacts arise according to varying a time period covered by each time block 312 and the corresponding variation in the data wrapping.

Figure 4:
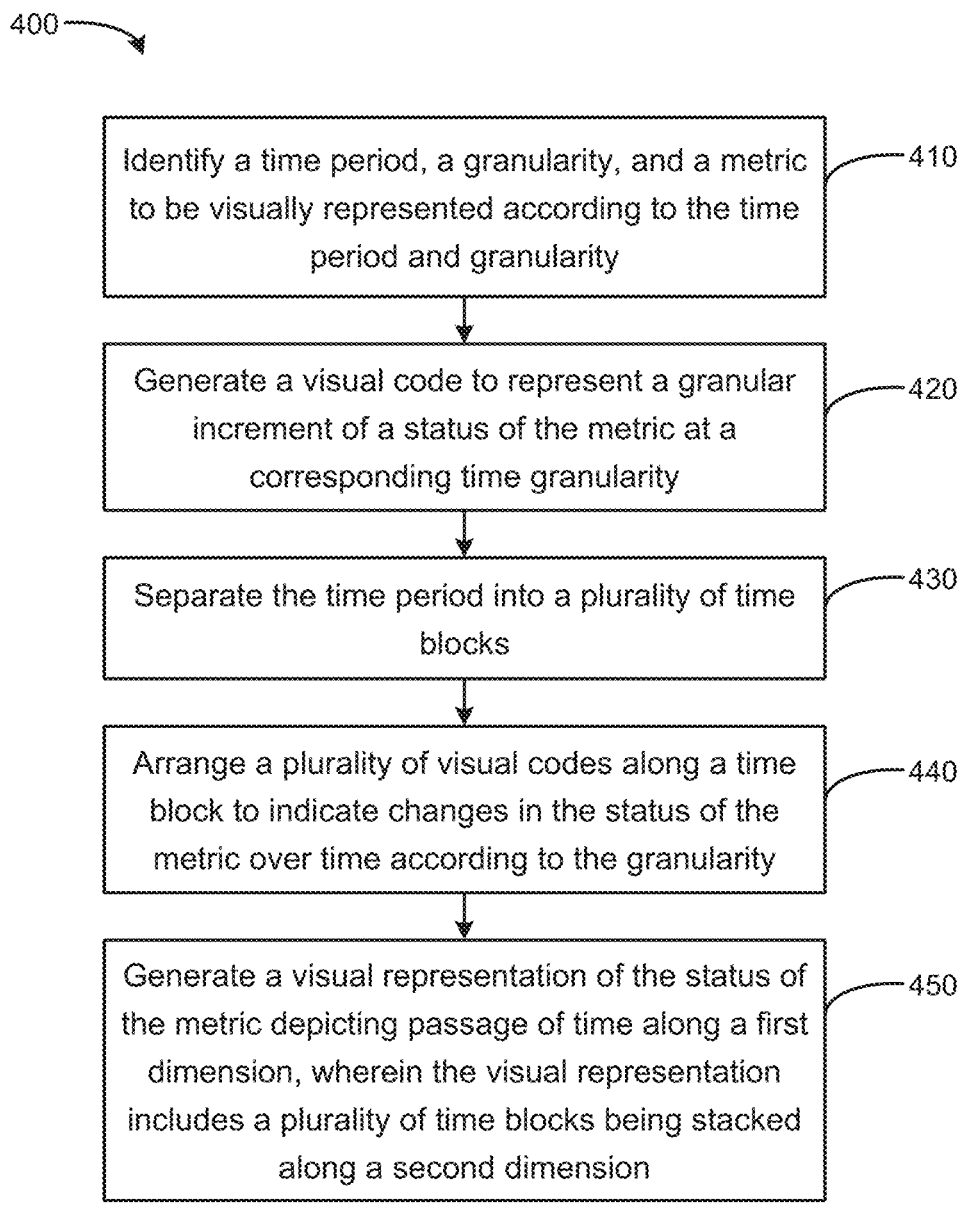
FIG. 4 is a flow chart based on generating a visual representation according to an example.

Referring to FIG. 4, a flow diagram is illustrated in accordance with various examples of the present disclosure. The flow diagram represents processes that may be utilized in conjunction with various systems and devices as discussed with reference to the preceding figures. While illustrated in a particular order, the disclosure is not intended to be so limited. Rather, it is expressly contemplated that various processes may occur in different orders and/or simultaneously with other processes than those illustrated.

FIG. 4 is a flow chart 400 based on generating a visual representation according to an example. In block 410, a time period, a granularity, and a metric to be visually represented are identified according to the time period and granularity. For example, a computing system may use a default time period of a week, granularity of one second, and a metric of connection quality, and/or prompt for user input regarding such variables. In block 420, a visual code is generated, to represent a granular increment of a status of the metric at a corresponding time granularity. For example, a visual code may include a color to represent a state of a metric, with a brightness to represent a corresponding quality, for a given increment of time. Other dimensions may be represented, such as by a pattern of the visual code and/or displacement along a third spatial dimension. In block 430, the time period is separated into a plurality of time blocks. For example, the time period of one day may be broken into a plurality of time blocks each representing one hour. In block 440, a plurality of visual codes are arranged along a time block to indicate changes in the status of the metric over time according to the granularity. For example, each visual code may represent one or more seconds, and the visual code may be colored and set to a brightness level to indicate a state and quality of a given metric. In block 450, a visual representation of the status of the metric is generated, depicting passage of time along a first dimension, wherein the visual representation includes a plurality of time blocks being stacked along a second dimension. For example, the visual representation may show data corresponding to a week, with each time block representing a three-hour slice as represented horizontally, with a corresponding number of time blocks stacked together vertically to represent the full week of time.

Examples provided herein may be implemented in hardware, software, or a combination of both. Example systems can include a processor (processing resource 301 shown in FIG. 3) and memory resources for executing instructions stored in a tangible non-transitory medium 305 (e.g., volatile memory, non-volatile memory, and/or computer readable media). Non-transitory computer-readable medium can be tangible and have computer-readable instructions stored thereon that are executable by a processor to implement examples according to the present disclosure.

An example system (e.g., a computing device) can include and/or receive a tangible non-transitory computer-readable medium storing a set of computer-readable instructions (e.g., software). As used herein, the processor can include one or a plurality of processors such as in a parallel processing system. The memory can include memory addressable by the processor for execution of computer readable instructions. The computer readable medium can include volatile and/or non-volatile memory such as a random access memory ("RAM"), magnetic memory such as a hard disk, floppy disk, and/or tape memory, a solid state drive ("SSD"), flash memory, phase change memory, and so on. As used herein, the term "engine" may represent any combination of hardware and/or software to accomplish the features as described in the claims.

What is claimed is:

1. A device comprising:
a graphics engine to identify a time period, a granularity, and a metric to be visually represented according to the time period and granularity;
wherein the graphics engine is to generate a visual representation of a status of the metric that is updated according to the granularity during at least a portion of the time period, wherein the visual representation is to depict passage of time along a first dimension, wherein the graphics engine is to separate the time period into a plurality of time blocks to be depicted as being stacked along a second dimension of the visual representation, and wherein the graphics engine is to identify a periodic change in the status of the metric, and separate the time period into the time blocks based on the periodic change.

2. The device of claim 1, wherein a time block includes a plurality of visual codes, wherein a visual code is to represent a granular increment of the status of the metric to be visualized.

3. The device of claim 2, wherein the plurality of visual codes are based on a plurality of colors and brightness levels.

4. The device of claim 2, wherein the graphics engine is to depict a visual code using a single pixel of the visual representation.

5. The device of claim 1, wherein the graphics engine is further to generate reference information, to indicate passage of time throughout the visual representation.

6. The device of claim 1, wherein the visual representation is to depict a visual artifact extending through a plurality of time blocks, based on a duration of the time blocks and a change in the status of the metric to cause the visual artifact to become visually distinct.

7. The device of claim 1, wherein the graphics engine is further to identify a threshold block duration, and separate the time period into time blocks according to the threshold block duration.

8. The device of claim 1, wherein the graphics engine is further to identify a plurality of metrics to be visualized in the visual representation according to the time period and granularity, based on a corresponding plurality of visual codes.

9. A method, comprising:
identifying a time period, a granularity, and a metric to be visually represented according to the time period and granularity;
generating a visual code to represent a granular increment of a status of the metric at a corresponding time granularity;
identifying a periodic change in the status of the metric;
separating the time period into a plurality of time blocks based on the periodic change;
arranging a plurality of visual codes along a time block to indicate changes in the status of the metric over time according to the granularity; and
generating a visual representation of the status of the metric depicting passage of time along a first dimension, wherein the visual representation includes a plurality of time blocks being stacked along a second dimension.

10. The method of claim 9, further comprising animating the visual representation based on incrementing positions of the visual codes according to passage of time across the plurality of time blocks.

11. The method of claim 9, further comprising generating reference information, to demarcate passage of time throughout the visual representation.

12. A non-transitory machine-readable storage medium encoded with instructions executable by a computing system that, when executed, cause the computing system to:
identify a time period, a granularity, and a metric to be visually represented according to the time period and granularity;
identify a periodic change in a status of the metric;
separate the time period into a plurality of time blocks based on the periodic change;
depict a time block to visually indicate changes in the status of the metric over time according to the granularity;
generate reference information, to demarcate passage of time throughout the visual representation; and
generate a visual representation of the status of the metric depicting passage of time along a first dimension, wherein the visual representation includes a plurality of time blocks being stacked along a second dimension.

13. The storage medium of claim 12, wherein the metric indicates a quality of a data connection associated with the computing system.

14. The storage medium of claim 12, wherein a time block corresponds to passage of fifteen minutes of time at a granularity of one second, and wherein the reference information includes a binary pattern to indicate a day of the week and hour of the day corresponding to the time block.

* * * * *